United States Patent Office 3,513,907
Patented May 26, 1970

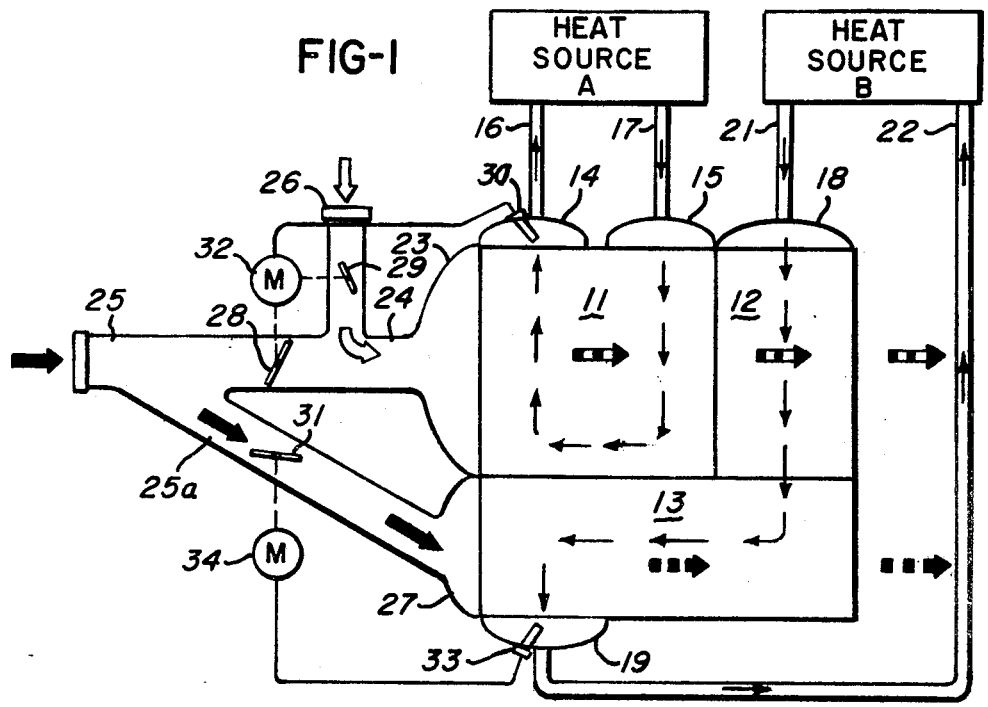
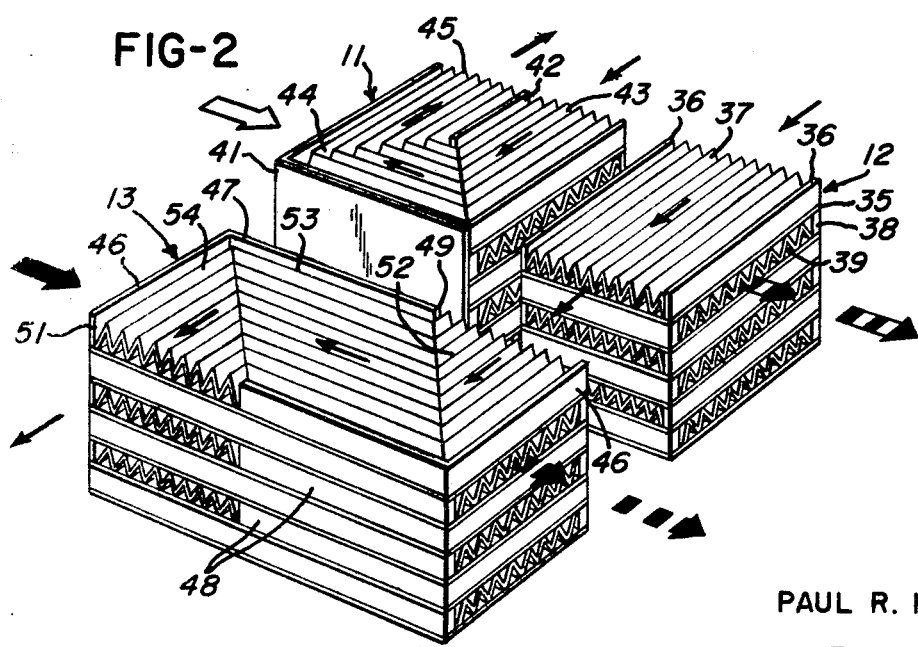

3,513,907
PLURAL MODE HEAT EXCHANGE APPARATUS
Paul R. Hughes, Englewood, Ohio, assignor to United Aircraft Products, Inc., Dayton, Ohio, a corporation of Ohio
Filed Apr. 17, 1968, Ser. No. 722,085
Int. Cl. F28b 27/00
U.S. Cl. 165—39         9 Claims

ABSTRACT OF THE DISCLOSURE

Heat exchange apparatus in which multiple liquid to air heat exchange components are in unitary assembly providing for alternative heating and cooling of a first circulating liquid and cooling of a second circulating liquid, at least a portion of one component being placed in series relation to another component so that air used to heat or to cool the first liquid will serve a secondary function in cooling the second liquid, valves being provided in advance of the heat exchange components to control in-flow of the cooling and heating air.

---

This invention relates to heat exchange apparatus and particularly to a heat exchanger capable of carrying out multiple heating and cooling modes with respect to a plurality of circulating fluids, especially fluids of higher and lower temperature.

In a heat exchange system cooling two circulating fluids, using coolant from a common source, desired temperature values may be difficult to maintain when both circulating fluids are in need of maximum cooling, particularly when one thereof has relatively high heat absorption requirements. Hence systems of that class customarily are isolated from one another and draw separately upon the available coolant, resulting in undue complication and duplication of structure. Further, when one of the circulating fluids may be required to be heated, as well as to be cooled, it has been the practice to provide separate heat exchangers for heating and for cooling. This too is duplication and there may moreover be a complication of controls caused by the need to switch from use of one heat exchanger to another.

The instant invention has in view simplified heat exchange means in which integrated heat exchange components provide for cooling in parallel circuits and wherein a common component is used both for heating and for cooling one of the circulating fluids. To provide heat exchange apparatus so characterized is an object of the invention, it being contemplated that heat exchange apparatus in accordance with the invention be capable of the following cooling and heating modes:

(1) Cooling of both circulating fluids.
(2) Heating of a first circulating fluid simultaneously with cooling of the second fluid.
(3) Cooling of the first circulating fluid only.
(4) Cooling of the second circulating fluid only.

In carrying out objectives of the invention there has been provided, in accordance with the illustrated embodiment of the invention, three heat exchanger components joined into an integral structure. Through one thereof is circulated a first fluid selectively subject to heating and to cooling. The second and third components are in a series relation with respect to a second circulating fluid which is directed thereto for cooling. The described second component further is in a series relation to the first component with respect to the cooling and heating fluids so that fluid passed through the first component, whether for cooling or heating purposes is conducted through the second component and serves a cooling function. Valves stationed in advance of the heat exchange apparatus control in-flow of the cooling and heating fluids and respond separately to changing temperatures of the described first and second fluids to accomplish the various heating and cooling modes as described above.

Other objects and structural details of the invention will appear from the following description, when read in connection with the accompanying drawings, wherein:

FIG. 1 is a diagrammatic view of heat exchange apparatus in accordance with the illustrated embodiment of the invention; and FIG. 2 is a view in exploded perspective, and partly diagrammatic, of heat exchanger components comprising the integrated structure of the invention, top closing plates of the heat exchanger components being omitted.

In the illustrated embodiment of the invention, heat exchanger components 11, 12 and 13 are assembled in a unitary relation. A first set of flow passages in component 11 is in communication through manifolds 14 and 15 and conduits 16 and 17 with a Heat Source A. Corresponding first flow passages in heat exchanger component 12 and heat exchanger component 13 are in series relation with one another and communicate through respective manifolds 18 and 19 and conduits 21 and 22 with a Heat Source B. The arrangement is one defining a pair of closed liquid loops, the liquid being circulated in such loops by pump means not shown.

Other flow passages in the heat exchanger component 11 are in series relation to corresponding passages in heat exchanger component 12 and communicate at one end through a manifold 23 with a duct 24. At their opposite ends the described other flow passages are open to discharge into ambient surroundings. Duct 24 is supplied alternatively with cooling air through an entrance duct 25 or with relatively higher temperature heating air by way of an alternate entrance duct 26. Heat exchanger component 13 has other flow passages, corresponding to described other flow passages of components 11 and 12 and in a parallel relation thereto. At their one end the corresponding other flow passages of component 13 receive cooling air from duct 25 by way of branch passage 25a and manifold 27. The opposite end of the said other flow passages in component 13 discharge to ambient surroundings.

In entrance duct 25, in advance of the point at which alternate duct 26 opens into duct 24, is a flow control valve 28. Similar valves 29 and 31 are in entrance duct 26 and branch duct 25a, respectively. A temperature sensor 30 is installed in manifold 14 and controls operation of a motor 32 selectively to position valves 28 and 29. A temperature sensor 33 is installed in manifold 19 to control a motor 34 to position valve 31.

The disclosed heat exchange apparatus and system controls associated therewith lend themselves to efficient performance of a plurality of cooling and heating modes. An economic utilization of cooling air flow is made possible, and, as a result of combining heating and cooling modes in a single heat exchanger, simplification of structure is achieved and duplication avoided. In the operation of the system, when liquid circulating through heat exchanger component 11 is in need of cooling, as a result of absorbing heat in Source A, sensor 30 controls motor 32 to close valve 29 and to open valve 28. As a result, heating air is prevented from reaching the heat exchanger while cooling air supplied to entrance duct 25 is free to flow past valve 28 into duct 24 and manifold 23 whence it moves through the described other flow passages in component 11 into heat transfer relation to the heated liquid. Similarly, should sensor 30 determine that the circulating liquid is below a desired temperature value motor 32 operates with reverse effect, to close valve 28 and to open valve 29. Cooling air is in this circumstance denied access to manifold 23 while heated air is free to enter entrance duct 26 and flow to the heat exchange apparatus.

In like manner, the temperature of liquid circulating in the closed loop including Heat Source B is sensed by sensor 33 and valve 31 appropriately positioned. When the liquid in this loop is in need of cooling, valve 31 suitably is opened and when the liquid is not in need of cooling the valve is closed. Positions of modulated flow between fully opened and fully closed are, of course, possible with all the valves.

The heat exchanger components are constructed and arranged to achieve an efficiency consistent with heat transfer requirements. To this end, and in accordance with the invention, heat exchanger component 13 is adapted to remove sufficient heat from liquid circulating through Heat Source B to maintain a predetermined low temperature thereof even under maximum heat load conditions, when all the available cooling fluid at entrance duct 25 is diverted through duct 25a. This would be substantially in the illustrated position wherein valve 28 is closed and valve 31 is substantially fully open. However, under operating conditions finding both valves 28 and 31 open the amount of cooling fluid available to heat exchanger component 13 may be inadequate alone to maintain the desired low temperature at Heat Source B. Accordingly, heat exchanger component 12 is placed in series with heat exchanger component 13 in respect of liquid flow and is placed in series relation to heat exchanger component 11 in respect of flow of the heating and cooling fluids. Accordingly, the latter fluids, after passing through heat exchanger component 11 to exert a cooling or heating effect upon the liquid circulating through Heat Source A, pass through heat exchanger component 12 in heat transfer relation to hot liquid coming from Heat Source B, exerting a preliminary or initial cooling thereof, lessening the heat removing requirements on heat exchanger component 13. It will be understood, in this connection, that the liquid entering heat exchanger component 12 from Source B is hot whereas the transfer fluids flowing therethrough are of lower temperature. These fluids, being exposed in heat exchanger component 11 to heat transfer relation with liquid from Source A, have an intermediate temperature neither hot nor cold and in either case below the temperature of liquid issuing from Source B. In this connection, the system contemplates operation under conditions in which the liquid flowing through Source B reaches a relatively higher temperature than the liquid circulated through Heat Source A.

In the illustrated system, liquid supplied Heat Source A is prevented from falling below a predetermined low temperature as well as from exceeding a predetermined high temperature. Heating fluid, in the form of hot air drawn from any convenient source, is supplied through entrance duct 26 for this purpose. Heat exchanger component 11 serves both a cooling and heating function, one mode or the other being selected by positioning of the valves 28 and 29. Moreover, heating of the liquid from Source A may be carried out simultaneously with cooling of the liquid from Source B, a positioning of the valves to achieve this effect being illustrated in FIG. 1. In utilizing heat exchanger component 11 for heating as well as cooling, the cooling fluid control valve is required to be located upstream of the heat exchanger core, with hot air being introduced between the cooling fluid valve and the heat exchanger when heating of the Source A liquid is required. This arrangement simplifies divergent ducting to the parallel sides of the heat exchanger core and avoids the need for outlet manifolds. The cooling fluid may conventionally be air, either ambient or cooled air supplied from a pressure source, for example an engine driven turbine.

The heat exchanger components 11, 12 and 13 may assume various forms within known concepts of liquid to air heat exchangers. In the illustrated instance they are plate and fin type heat exchangers each comprising an individual core with the several components joined together in a brazing or like process to complete a unitary structure. As shown in FIG. 2, the units are alike in their general configuration and in the manner in which flat heat conductive plates, corrugated fin material and spacers are used to form separated flow passages for different fluids. Component 12, for example, comprises superposed vertically spaced apart heat conductive plates 35. On an upper plate 35 are laterally spaced apart side spacers 36 and between these is corrugated strip fin material 37 defining a liquid flow path. On the next lower plate 35 are end spacers 38 disposed at right angles to the side spacers 36 and confining therebetween an airway strip fin 39. This alternating arrangement of liquid and air flow passages is repeated a number of times calculated to produce the needed amount of heat transfer surface. The arrangement is one of a single pass, cross flow heat exchanger wherein the liquid and air flow at right angles to one another and flow from end to end or from side to side of the core in a single pass. Other arrangements are, of course, possible including one in which the liquid or air or both move in a circuitous or multiple pass arrangement through the heat exchanger. Such a construction adds to the pressure drop of the concerned fluids but raises heat transfer capabilities of a given size core.

The heat exchanger component 11 is constructed like the component 12. However, a plate 41 is mounted to one end thereof in closing relation to the liquid flow passages. Further, these passages contain a short length baffle 42 by which the liquid from Source A is caused to flow in a counter cross flow relation to the heating or cooling fluids admitted to the air flow passages from manifold 23. The fin material in the liquid flow passages is suitably formed to turn the liquid around baffle 42. A section 43 is disposed to receive the liquid from manifold 15 and to direct it to a cross section 44 beyond baffle 42, with the liquid returning towards the front end of the core by way of a fin section 45.

In fabricating heat exchanger component 13 the liquid flow passages are closed at their ends by spacers 46 and are partly closed at their sides by longitudinally offset spacers 47 and 48. The arrangement is one to provide longitudinally offset inlet and outlet flow openings 49 and 51 on respectively opposite sides of the core. Suitably formed fin sections 52, 53 and 54 accept the liquid entering inlet 49, direct it lengthwise of the core and turn it to exit by way of outlet 51. In the process, the liquid is progressively in cross flow, counter flow and cross flow relation to fluid flowing through the air passageways.

In assembling the heat exchanger components they are disposed in the manner indicated to place the air flow passages of component 12 in line with the air flow passages in component 11 and to place the liquid flow passages in component 12 in line with liquid inlet openings 49 of component 13. With the parts in a flush mating engagement they are brazed together to form in effect a single unitary structure. Manifolds 14, 15, 18 and 19 are suitably attached as by welding to proper locations on the faces of the heat exchanger components. Source A liquid flows from manifold 15 through the liquid flow passages in component 11, being guided by fin strip materials 43, 44 and 45, in a U-shaped route from one side of spacer 42 to the other to exit into manifold 14. Source B liquid flows from manifold 18 longitudinally through the liquid flow passages of heat exchanger component 12, is admitted to component 13 by way of openings 49 and is directed by fin strips 52, 53 and 54 to outlet 51 whence it discharges to manifold 19. Cooling or heating air flows through the air flow passages of component 11 and through the aligned air flow passages of component 12. A parallel stream of cooling air may flow through the air flow passages of component 13.

The heat transfer system hereof has been shown in a diagrammatic form inasmuch as details of the heat exchange apparatus and flow control mechanisms are not essential to an understanding of the invention. Further, structural details may vary without departing from the spirit and teachings of the invention. For example, applicant is not limited to use of plate and fin type heat exchange apparatus nor even to such apparatus physically joined together in multiple components as here shown. Separated units of a tubular or other form might also be used, as long as the relative positions of one to the other with respect to the air and liquid flows is maintained. The valve mechanisms may assume various forms as well as the controls therefor. The motor 32 has been shown herein as a common actuator for the valves 28 and 29 inasmuch as commercial actuators which may serve such a dual function are available. A separate actuator for each valve may be provided if desired. In general, a preferred embodiment of the invention has been disclosed, but it is intended that the scope of the invention should be limited only by the claims allowed herein.

What is claimed is:

1. Heat exchange apparatus, including first heat exchange means having an inlet and an outlet by which a first fluid is passed for cooling or for heating and through which a plurality of temperature modifying fluids selectively are passed in heat transfer relation to said first fluid, said first heat exchange means having a temperature modifying fluid outlet, second heat exchanger means having an inlet and an outlet by which a second fluid higher in temperature than said first fluid is passed for cooling and through which a cooling fluid is passed in heat transfer relation to said second fluid, said second heat exchanger means having a cooling fluid outlet, at least a portion of said second heat exchanger means being arranged in series relation to said first heat exchanger means with respect to the flow of temperature modifying fluids so that said temperature modifying fluids after passing through said first heat exchanger means to raise or to lower the temperature of said first fluid flow through said portion of said second heat exchanger means to said cooling fluid outlet to cool said second fluid and hence assume the character of cooling fluids with respect to said second heat exchanger means, and valve means controlling flow of said temperature modifying fluids.

2. Heat exchange apparatus according to claim 1, characterized by means for conducting a cooling fluid through another portion of said second heat exchanger means, and valve means for controlling flow of said last mentioned cooling fluid.

3. Heat exchange apparatus according to claim 2, characterized in that said cooling fluid constitutes one of said temperature modifying fluids, there being separate ducts leading to said first heat exchanger means and to said other portion of said second heat exchanger means supplied with said cooling fluid from a common source, another temperature modifying fluid being a heating fluid independently supplied the duct leading to said first heat exchanger means, there being separate valve means in advance of said heat exchanger means controlling flow of said cooling fluid through said separate ducts, the heating fluid being supplied to the duct leading to said first heat exchanger means at a location intermediate the heat exchanger means and the cooling fluid control valve means.

4. Heat exchange apparatus according to claim 3, characterized by a further valve means controlling supply of said heating fluid.

5. Heat exchange apparatus according to claim 4, characterized in that said separate ducts comprise a pair of cooling fluid supply ducts, there being valve means in one duct responding to changing temperature of said second fluid to control flow of cooling fluid to said other portion of said second heat exchanger means and there being valve means in the other duct responding to changing temperature of said first fluid to control flow of cooling fluid to said first heat exchanger means, said further valve means being in a duct leading to said other duct beyond the valve means therein and responding to changing temperature of said first fluid to control flow of heating fluid to said first heat exchanger means.

6. Heat exchange apparatus, including a heat exchanger providing separated parallel flow paths therethrough for a cooling fluid, said flow paths having outlet means, means for flowing a heating fluid through one of said parallel flow paths, said heat exchanger providing a flow pass having an inlet and an outlet for a first fluid in a portion of which said first fluid is in heat transfer relation to fluid flowing through said one flow path and in another portion of which it is in heat transfer relation to cooling fluid flowing through the other one of said parallel flow paths, said heat exchanger providing a flow pass having an inlet and an outlet, for a second fluid in which said second fluid is in heat transfer relation to fluid flowing through said one flow path, said one flow path having an initial portion in which the fluids flowing therethrough are in heat transfer relation to said second fluid and a subsequent portion in which the fluids flowing therethrough are in heat transfer relation to said first fluid, and valve means controlling the flow of said cooling and heating fluids, said valve means being stationed in advance of said heat exchanger and including valves controlling flow through said one flow path, one controlling flow of the cooling fluid and the other controlling flow of the heating fluid, the latter being located to flow heating fluid to the heat exchanger irrespective of the position of the valve controlling flow of cooling fluid.

7. In a heat exchanger adapted for a cooling mode with respect to a first flowing fluid and a heating and cooling mode with respect to a second flowing fluid, a flow path through which a cooling fluid and a heating fluid alternatively are directed, said flow path having an outlet, an initial portion of said flow path with respect to the direction of flow of said cooling and heating fluids being used to cool or to heat said second fluid and a subsequent portion of said flow path utilizing the fluid leaving said initial portion for initial cooling of said first fluid, and another flow path parallel to the first said flow path through which cooling fluid is directed, said other flow path having an outlet, said first fluid having a passage through the heat exchanger including an inlet and an outlet bringing it first into heat transfer relation to fluids in said subsequent portion of the first said flow path for initial cooling and then into heat transfer relation to said cooling fluid in said other flow path for further cooling, said second flowing fluid having a passage through the heat exchanger bringing it into heat transfer relation to fluids in the initial portion of the first said flow path, said last named passage having an inlet and an outlet for said second flowing fluid.

8. Heat exchange apparatus according to claim 7, characterized by a valve in advance of said other flow path responding to changing temperature of said first fluid after further cooling thereof to control in-flow of cooling fluid into said other flow path.

9. Heat exchange apparatus according to claim 7, characterized by separate valves in advance of the first said flow path respectively controlling the in-flow of cooling fluid and of heating fluid thereinto, and means responding to the changing temperature of said second fluid after passage through the heat exchanger to position said valves.

References Cited

UNITED STATES PATENTS

| | | | |
|---|---|---|---|
| 1,651,900 | 12/1927 | Pagel | 165—39 |
| 2,654,580 | 10/1953 | Shaw | 165—27 |
| 2,914,917 | 12/1959 | Van Hest | 165—39 X |
| 3,028,734 | 4/1962 | Weinstein | 165—27 X |
| 3,294,161 | 12/1966 | Wood | 165—140 |

FOREIGN PATENTS 288,982  9/1931  Italy.

ROBERT A. O'LEARY, Primary Examiner

T. W. STREULE, Assistant Examiner